(12) United States Patent
Trudeau et al.

(10) Patent No.: US 10,589,468 B2
(45) Date of Patent: Mar. 17, 2020

(54) COMPOSITE RIVET BLANK AND INSTALLATION THEREOF

(71) Applicant: Bombardier Inc., Dorval (CA)

(72) Inventors: Paul Trudeau, Guelph (CA); Louis Laberge Lebel, Montreal (CA); Alain Landry, Beaconsfield (CA); Didier Hoste, Mascouche (CA)

(73) Assignee: BOMBARDIER INC., Dorval (CA)

( * ) Notice: Subject to any disclaimer, the term of this patent is extended or adjusted under 35 U.S.C. 154(b) by 327 days.

(21) Appl. No.: 15/123,084

(22) PCT Filed: Mar. 6, 2015

(86) PCT No.: PCT/IB2015/051651
§ 371 (c)(1),
(2) Date: Sep. 1, 2016

(87) PCT Pub. No.: WO2015/132766
PCT Pub. Date: Sep. 11, 2015

(65) Prior Publication Data
US 2017/0066182 A1    Mar. 9, 2017

Related U.S. Application Data

(60) Provisional application No. 61/949,449, filed on Mar. 7, 2014.

(51) Int. Cl.
*F16B 5/00* (2006.01)
*B29C 65/60* (2006.01)
(Continued)

(52) U.S. Cl.
CPC .......... *B29C 65/605* (2013.01); *B21J 15/147* (2013.01); *B29C 65/18* (2013.01); *B29C 65/32* (2013.01);
(Continued)

(58) Field of Classification Search
CPC .............. F16B 5/04; F16B 19/06; F16B 5/00
(Continued)

(56) References Cited

U.S. PATENT DOCUMENTS 1,322,848 A    11/1919   Henke
1,329,144 A    1/1920    Rypinski
(Continued)

FOREIGN PATENT DOCUMENTS

AU    3984772 A    9/1973
CN    102478039 A   5/2012
(Continued)

OTHER PUBLICATIONS

Bruce K. Fink et al., Induction Heating of Carbon-Fiber Composites: Electrical Potential Distribution Model, Army Research Laboratory, Nov. 1999, ARL-TR 2130, United States of America.
(Continued)

*Primary Examiner* — Roberta S DeLisle
(74) *Attorney, Agent, or Firm* — Norton Rose Fulbright Canada LLP

(57) ABSTRACT

Composite fasteners, associated blanks and also methods and apparatus for the installation of such fasteners are disclosed. An exemplary composite rivet (10) disclosed comprises an elongated body including braided reinforcement fibers (14) embedded inside the body and supported in a matrix material (16). Also disclosed are structural assemblies comprising composite fasteners and panels or other parts comprising composite and/or other materials.

12 Claims, 15 Drawing Sheets

(51) Int. Cl.
| | |
|---|---|
| *B29C 65/18* | (2006.01) |
| *B29C 65/32* | (2006.01) |
| *B29C 65/78* | (2006.01) |
| *B29C 65/00* | (2006.01) |
| *F16B 5/04* | (2006.01) |
| *F16B 19/06* | (2006.01) |
| *B21J 15/14* | (2006.01) |
| *B29C 70/84* | (2006.01) |
| *B29C 70/24* | (2006.01) |
| *B29L 31/30* | (2006.01) |
| *B29C 65/30* | (2006.01) |
| *B29C 70/46* | (2006.01) |
| *B29K 101/12* | (2006.01) |
| *B29K 105/06* | (2006.01) |
| *B29K 307/04* | (2006.01) |

(52) U.S. Cl.
CPC ........ *B29C 65/601* (2013.01); *B29C 65/7841* (2013.01); *B29C 66/1122* (2013.01); *B29C 66/21* (2013.01); *B29C 66/43* (2013.01); *B29C 66/721* (2013.01); *B29C 66/7422* (2013.01); *B29C 66/8181* (2013.01); *B29C 66/81431* (2013.01); *B29C 66/81811* (2013.01); *B29C 66/81812* (2013.01); *B29C 66/8223* (2013.01); *B29C 66/8242* (2013.01); *B29C 66/83221* (2013.01); *B29C 70/24* (2013.01); *B29C 70/845* (2013.01); *F16B 5/04* (2013.01); *F16B 19/06* (2013.01); *B29C 65/30* (2013.01); *B29C 66/71* (2013.01); *B29C 66/7212* (2013.01); *B29C 66/72141* (2013.01); *B29C 66/81423* (2013.01); *B29C 70/462* (2013.01); *B29K 2101/12* (2013.01); *B29K 2105/06* (2013.01); *B29K 2307/04* (2013.01); *B29K 2995/0027* (2013.01); *B29K 2995/0077* (2013.01); *B29L 2031/3002* (2013.01); *B29L 2031/3082* (2013.01); *B29L 2031/3085* (2013.01); *B29L 2031/3088* (2013.01); *F16B 5/00* (2013.01)

(58) Field of Classification Search
USPC .................................. 411/500, 501, 906, 908
See application file for complete search history.

(56) References Cited

U.S. PATENT DOCUMENTS

| | | | | |
|---|---|---|---|---|
| 2,562,018 A * | 7/1951 | Colley | ............. | F16B 19/12 411/500 |
| 2,685,813 A * | 8/1954 | Lampman | ............. | B29C 63/20 29/433 |
| 3,022,802 A * | 2/1962 | Lewis | ............. | F16L 9/12 118/419 |
| 3,452,149 A * | 6/1969 | Rinaldi | ............. | H05K 3/4046 174/261 |
| 4,007,303 A | 2/1977 | Schuster et al. | | |
| 4,173,670 A * | 11/1979 | VanAuken | ............. | B29C 53/562 138/123 |
| 4,581,263 A * | 4/1986 | Lukas | ............. | B29C 33/76 138/144 |
| 4,659,268 A * | 4/1987 | Del Mundo | ............. | F16B 19/04 411/34 |
| 4,687,396 A | 8/1987 | Berecz | | |
| 4,717,302 A * | 1/1988 | Adams | ............. | B29C 70/24 411/378 |
| 4,736,507 A | 4/1988 | Berecz et al. | | |
| 4,863,330 A | 9/1989 | Olez et al. | | |
| 5,025,128 A | 6/1991 | Derbyshire | | |
| 5,080,547 A * | 1/1992 | Moghe | ............. | B29C 53/585 156/393 |
| 5,092,727 A | 3/1992 | Moghe | | |
| 5,114,290 A * | 5/1992 | Moghe | ............. | B29C 53/585 156/391 |
| 5,127,783 A * | 7/1992 | Moghe | ............. | B29C 70/222 156/172 |
| 5,314,282 A | 5/1994 | Murphy et al. | | |
| 5,361,483 A | 11/1994 | Rainville et al. | | |
| 8,172,484 B2 * | 5/2012 | Tsukamoto | ............. | E21D 21/0006 405/259.1 |
| 8,448,324 B2 | 5/2013 | Berger et al. | | |
| 8,613,580 B2 * | 12/2013 | Hecht | ............. | F16B 33/006 411/424 |
| 9,090,029 B2 * | 7/2015 | Prevost | ............. | B29C 70/506 |
| 2005/0186051 A1 | 8/2005 | Keech | | |
| 2006/0200967 A1 | 9/2006 | Adams et al. | | |
| 2012/0124816 A1 | 5/2012 | Berger et al. | | |

FOREIGN PATENT DOCUMENTS

| | | |
|---|---|---|
| DE | 623911 | 1/1936 |
| DE | 102014006681 A1 | 11/2015 |
| EP | 1508429 A1 | 2/2005 |
| FR | 2974867 A1 | 11/2012 |
| GB | 326147 | 3/1930 |
| GB | 1193782 | 6/1970 |
| WO | 2014196268 A1 | 12/2014 |

OTHER PUBLICATIONS

Stephen Andrew Sarles, Active Rigidization of Carbon Fiber Reinforced Composites via Internal Resistive Heating, Chapter 2—Controlled Resistive Heating of Carbon-Fiber Composites; Feb. 2006, United States of America, https://theses.lib.vt.edu/theses/available/etd-03282006-101109/unrestricted/09_chapter_2.pdf; accessed on Feb. 1, 2017.
PCT international Search Report and Written Opinion dated May 18, 2015 re: International Application No. PCT/IB2015/051651.
ACP (Advanced Composite Products), Click Bond, www.clickbond.com . . . ; accessed Mar. 7, 2014.
Bolt & Screws, Click Bond, www.clickbond.com . . . ; accessed Mar. 7, 2014.
Composite Nutplates, Click Bond, www.clickbond.com . . . ; accessed Mar. 7, 2014.
Full English text of European patent publication No. EP 1508429 published on Feb. 23, 2005 from www37.orbit.com . . . .
Full English text of France patent publication No. FR 2974867 published on Nov. 9, 2012 from www37.orbit.com . . . .
English translation of China patent document No. CN102478039 dated May 30, 2012, https://www38.orbit.com/?locale=en&ticket=a3677822-7b98-40cc-b8ab-f8a79a9e52f0#PatentDocumentPage, accessed on Apr. 17, 2018.
The State Intellectual Property Office of the People'S Republic of China; Notification of First Office Action dated Feb. 13, 2018 re: China patent application No. 201580012582.8.
International Searching Authority, Notification of Transmittal of the International Search Report and The Written Opinion of the International Searching Authority, or the Declaration dated May 30, 2018 re: International Application No. PCT/IB2018/051448.
English translation of German patent document No. DE102014006681 dated Nov. 12, 2015, https://patents.google.com/patent/DE102014006681A1/en?oq=DE+102014006681+A1, accessed on Jul. 23, 2018.
English translation of International patent document No. WO2014196268 dated Dec. 11, 2014, https://patents.google.com/patent/WO2014196268A1/en?oq=WO2014196268+A1, accessed on Jul. 23, 2018.
China National Intellectual Property Administration, Notification Of The Third Office Action dated Apr. 25, 2019 re: application No. 201580012582.8.
China National Intellectual Property Administration, Notification of the Second Office Action dated Oct. 15, 2018 re: application No. 201580012582.8.

* cited by examiner

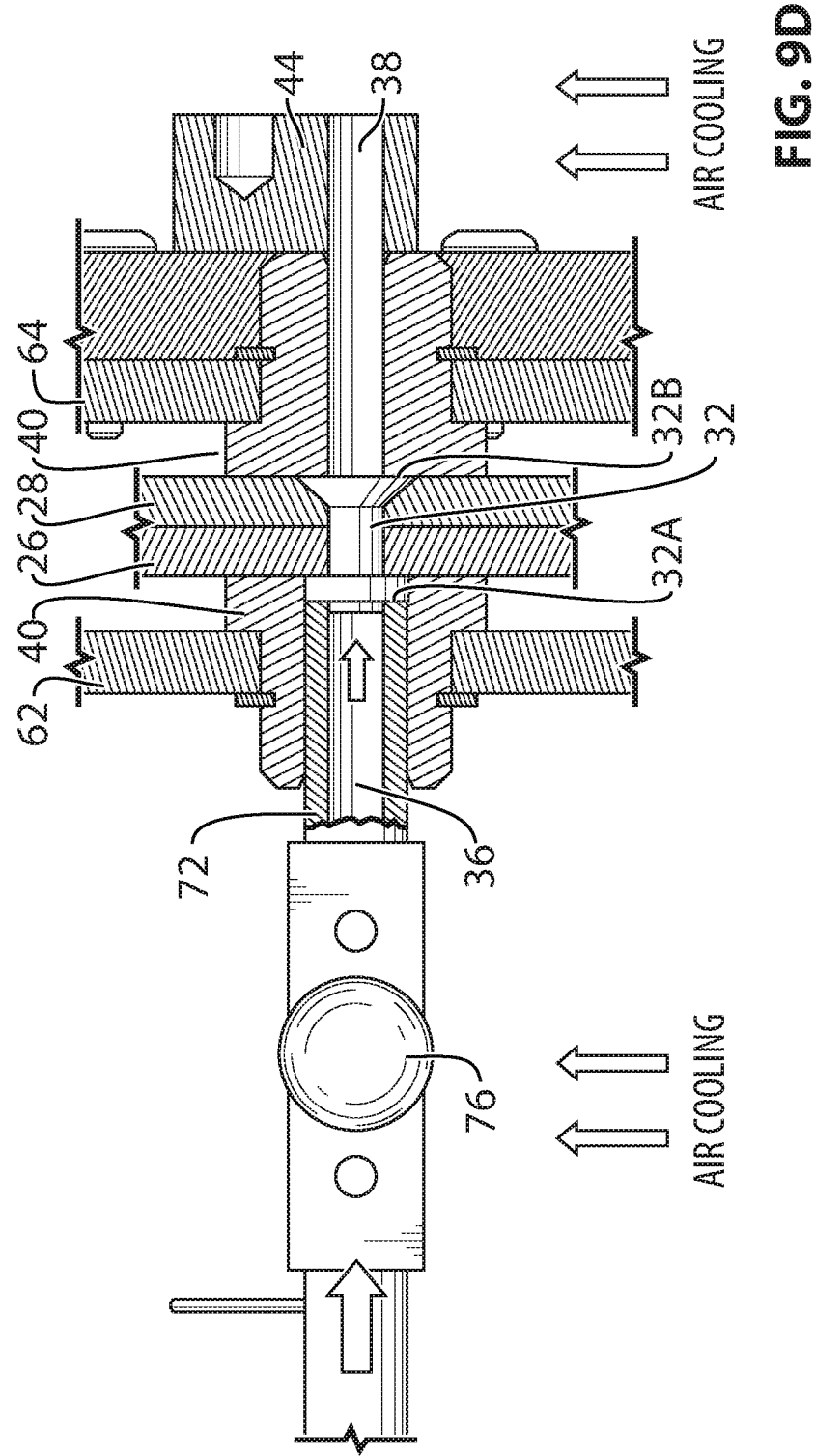

COMPOSITE RIVET BLANK AND INSTALLATION THEREOF

CROSS-REFERENCE TO RELATED APPLICATION(S)

This application is a national phase application under 35 U.S.C. 371 of International Patent Application No. PCT/IB2015/051651 filed on Mar. 6, 2015, which claims priority from U.S. Provisional Patent Application Ser. No. 61/949,449 filed on Mar. 7, 2014, the entire content of which is incorporated herein by reference.

TECHNICAL FIELD

The disclosure relates generally to composite materials and more particularly to composite fasteners useful in fastening parts comprising composite or other materials.

BACKGROUND OF THE ART

Fiber-reinforced polymeric resin composite materials are becoming more widely used in aircraft structures due to their strength to weight characteristics. Current fastening methods for securing composite parts together can require relatively complicated tooling and procedures. For example, titanium fasteners have been used to secure composite parts but such fasteners are relatively expensive. Also, due to the material and mechanical properties of composite materials, the use of titanium rivets requires advanced drilling techniques to avoid or minimize stress concentrations in the composite parts. Alternatively, the use of aluminum rivets may not be appropriate for securing parts made of composite materials due to compatibility issues that may result in galvanic corrosion between the aluminum and carbon in the composite material.

For aircraft applications, the use of electrically conductive metallic fasteners in composite materials with a very low electrical conductivity can also cause some concerns associated with electromagnetic interference (EMI) and lightning strike protection.

Improvement is therefore desirable.

SUMMARY

The disclosure describes composite fasteners, associated blanks and also methods and apparatus for the installation of such fasteners. Also disclosed are structural assemblies comprising such fasteners and panels or other parts comprising composite and/or other materials. The fasteners and associated blanks disclosed herein may be used in aircraft, automotive and/or other applications.

In one aspect, the disclosure describes a composite rivet blank where the blank comprises an elongated body having an axis and a length along the axis where the body comprises braided reinforcement fibers embedded inside the body and supported in a matrix material.

The braided reinforcement fibers may extend the length of the body.

The body may have a substantially uniform transverse cross-section along its length.

The matrix material may comprise a thermoplastic.

For example, the matrix material may comprise any one of: nylon, polyetherimide (PEI), polyethersulfone (PES), polyphenylene sulfide (PPS), polyetheretherketone (PEEK) and polyetherketoneketone (PEKK).

The fibers may comprise carbon.

The fibers may comprise glass.

In some embodiments, at least some of the fibers may be oriented at an inclination angle between 15 degrees and 30 degrees from the axis of the body.

In some embodiments, at least some of the fibers may be oriented at an inclination angle of about 20 degrees.

The volume fraction of reinforcement fibers in the body may be between 55% and 63%.

The volume fraction of reinforcement fibers in the body may be about 60%.

The body may comprise one of a pultruded rod and a compression molded rod.

The fibers may be arranged in a biaxial braid.

In another aspect, the disclosure describes a composite fastener blank. The blank comprises an elongated body having a longitudinal axis and a length along the axis, the body having a substantially uniform transverse cross-section along its length, the body comprising continuous reinforcement fibers embedded inside the body and extending the length of the body, the reinforcement fibers being supported in a matrix material and at least part of the reinforcement fibers within the length of the body extend in a direction non-parallel to the axis of the body.

The matrix material may comprise a thermoplastic.

For example, the matrix material may comprise any one of: nylon, polyetherimide (PEI), polyethersulfone (PES), polyphenylene sulfide (PPS), polyetheretherketone (PEEK) and polyetherketoneketone (PEKK).

The fibers may comprise carbon.

The fibers may comprise glass.

The fibers may be braided.

The fibers may be arranged in a biaxial braid.

In some embodiments, at least some of the fibers may be oriented at an inclination angle between 15 degrees and 30 degrees from the longitudinal axis of the body.

In some embodiments, at least some of the fibers may be oriented at an inclination angle of about 20 degrees.

The volume fraction of reinforcement fibers in the body may be between 55% and 63%.

The volume fraction of reinforcement fibers in the body may be about 60%.

The body may comprise one of a pultruded rod and a compression molded rod.

In another aspect, the disclosure describes a composite structural assembly. The structural assembly comprises:
 a first part having a first hole formed therein;
 a second part having a second hole formed therein, the first part and the second part being positioned relative to each other so that the first hole is at least partially aligned with the second hole; and
 a composite rivet securing the first part and the second part together via the first hole and the second hole, the composite rivet comprising a body having braided reinforcement fibers embedded inside the body and supported in a matrix material.

The rivet may comprise a first finished end engaged with the first part and a second finished end engaged with the second part, at least one of the finished ends comprising a fiber anchoring artifact used to at least partially control the deformation of the fibers during thermoforming of the at least one of the finished ends.

The matrix material may comprise a thermoplastic.

The fibers may comprise carbon.

The fibers may comprise glass.

The fibers may be arranged in a biaxial braid.

In another aspect, the disclosure describes another composite structural assembly. The structural assembly comprises:
- a first part having a first hole formed therein;
- a second part having a second hole formed therein, the first part and the second part being positioned relative to each other so that the first hole is at least partially aligned with the second hole; and
- a composite rivet securing the first part and the second part together via the first hole and the second hole, the composite rivet comprising a blank as disclosed herein with a first finished end engaged with the first part and a second finished end engaged with the second part.

In another aspect, the disclosure describes an aircraft comprising one or more of the structural assemblies disclosed herein.

In another aspect, the disclosure describes a composite rivet. The rivet comprises: a body having braided reinforcement fibers embedded inside the body and supported in a matrix material, the body comprising a first finished end for engaging a first part and a second finished end for engaging a second part.

In some embodiments, at least one of the finished ends may comprise a fiber anchoring artifact used to at least partially control the deformation of the fibers during finishing of the at least one of the finished ends.

The matrix material may comprise a thermoplastic.

The fibers may comprise carbon.

The fibers may comprise glass.

The fibers may be arranged in a biaxial braid.

In another aspect, the disclosure describes a method for installing a composite rivet. The method comprises:
- inserting a composite rivet blank into a hole in a part;
- after insertion of the blank into the hole:
  - finishing a first end of the blank by thermoforming the first end of the blank; and
  - finishing a second end of the blank opposite the first end by thermoforming the second end of the blank.

Finishing the first end of the blank may comprise anchoring part of the first end of the blank to at least partially control the deformation of reinforcement fibers embedded inside the blank.

Finishing the second end of the blank may comprise anchoring part of the second end of the blank to at least partially control the deformation of the fibers embedded in the blank.

In some embodiments, the method may comprise heating the blank, before inserting the blank into the hole, to a temperature sufficient to permit the finishing of the first end and the second end.

In some embodiments, the method may comprise heating the blank, after inserting the blank into the hole, to a temperature sufficient to permit the finishing of the first end and the second end.

Finishing the second end may comprise deforming the second end to fill a countersink in the part and finishing the first end may comprise bucking the first end.

In a further aspect, the disclosure describes an apparatus for installing a composite rivet. The apparatus comprises:
- a first finishing member configured to be positioned on a first side of a part into which a composite rivet blank has been inserted and finish a first end of the blank by applying pressure to the first end of the blank;
- a second finishing member configured to be positioned on a second side of a part into which the blank has been positioned and finish a second end of the blank by applying pressure to the second end of the blank; and
- a heating element configured to heat the blank to a temperature sufficient to permit thermoforming of the first end and second end of the blank via the first finishing member and the second finishing member.

The heating element may be configured to heat the blank when the blank is outside of the part.

The heating element may be thermally coupled to at least one of the first finishing member and the second finishing member to cause heating of the blank via the at least one of the first finishing member and the second finishing member.

In some embodiments, at least one of the first finishing member and second finishing member may comprise a fiber anchoring feature configured to at least partially control deformation of reinforcement fibers in the blank during thermoforming of the at least one associated first end and second end of the blank.

The fiber anchoring feature may comprise a recess.

In some embodiments, at least one of the first finishing member and the second finishing member is thermally coupled to an active cooling device.

The first finishing member may comprise a ram disposed inside a sleeve where the sleeve is movable relative to the ram.

Further details of these and other aspects of the subject matter of this application will be apparent from the detailed description and drawings included below.

DESCRIPTION OF THE DRAWINGS

Reference is now made to the accompanying drawings, in which:

FIGS. 9A-9D schematically illustrate another exemplary method for installing the blank of FIG. 1 using the installation apparatus of FIG. 8.

DETAILED DESCRIPTION

Aspects of various embodiments are described through reference to the drawings.

The present disclosure relates to fasteners comprising composite materials. In various embodiments, the present disclosure discloses composite fasteners, associated blanks and also methods and apparatus for the installation of such fasteners. The present disclosure also discloses structures that incorporate such composite fasteners. The fasteners and associated blanks disclosed herein may be used to secure parts together including parts comprising composite materials. The fasteners and associated blanks disclosed herein may be used to secure parts together including parts comprising metallic material(s) (e.g., aluminum). The fasteners and associated blanks disclosed herein may also be used in hybrid structures comprising metallic and composite materials. Accordingly, the fasteners and associated blanks disclosed herein may be used in aircraft, automotive and/or other applications. In some embodiments, the fasteners disclosed herein may alleviate, at least in part, some concerns associated with conventional metallic fasteners used in composite parts with respect to electromagnetic interference shielding and electrostatic discharge inside aircraft and/or galvanic corrosion of dissimilar materials.

Figures 1A, 1B:
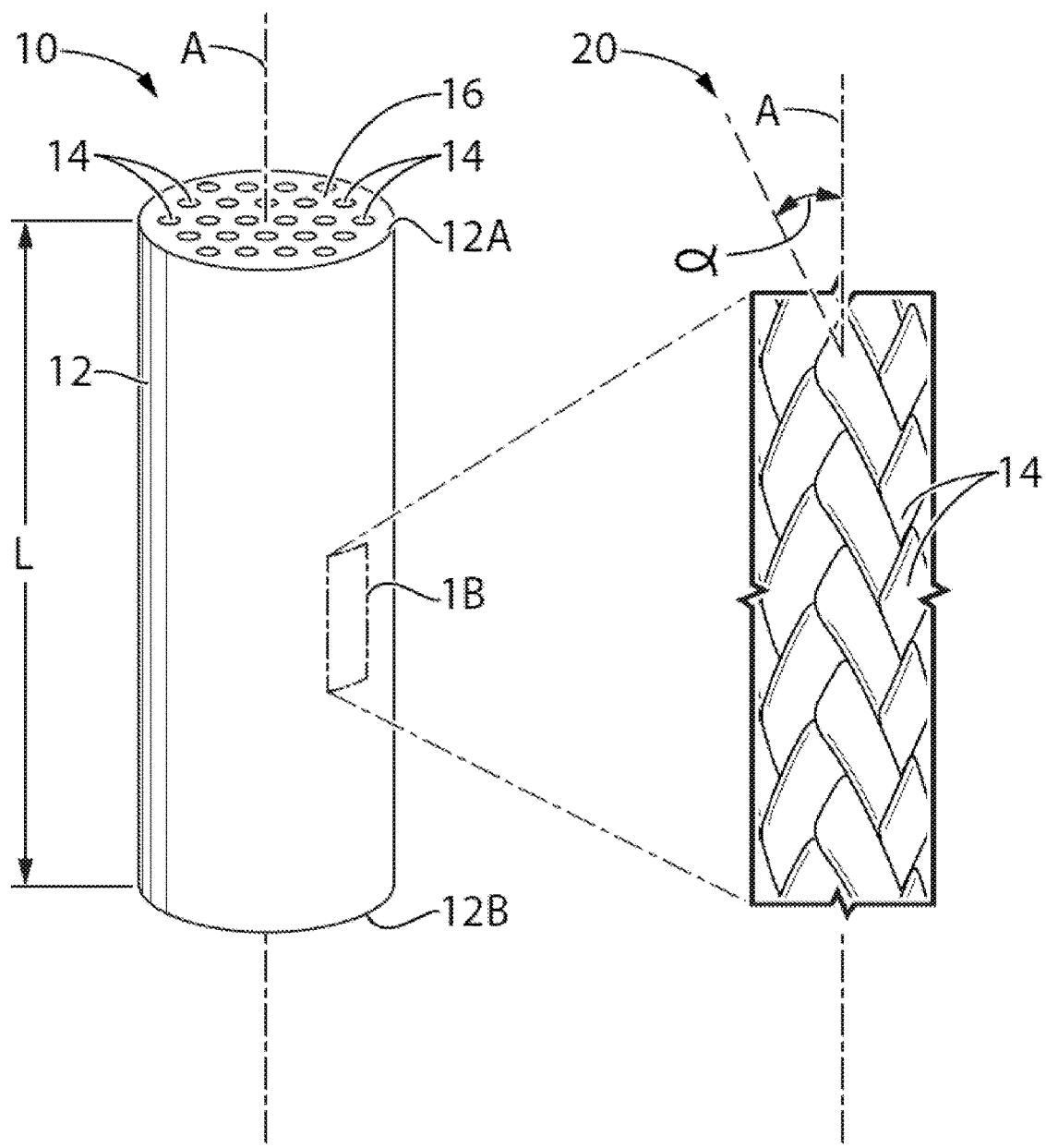
FIG. 1A is a schematic perspective view of an exemplary composite rivet blank.
FIG. 1B is a schematic representation of an exemplary braid structure of yarns of reinforcement fibers that may be embedded inside the blank of FIG. 1A.

FIG. 1A is a schematic perspective view of an exemplary composite fastener (e.g., rivet) blank 10 (referred hereinafter as "blank 10"). As explained further below, blank 10 may be a precursor to a suitable fastener for securing two or more parts together. Even though the structure of the fastener obtained from blank 10 may be different from conventional metallic rivets, the function of the fastener obtained with blank 10 may, in some embodiments, have similarities to that of conventional rivets and accordingly may be referred as a "rivet" in the present application. However, the term "rivet" is not intended to limit the structure or function of the fasteners or blanks disclosed herein.

Blank 10 may comprise elongated body 12 having longitudinal axis A and length L. Body 12 may have a generally cylindrical shape. For example, body 12 may have a generally circular transverse cross-section but body 12 could also have other cross-sectional shapes. In various embodiments, body 12 may have a substantially uniform cross-section along length L but body 12 could also have a cross-sectional shape and/or size that varies along its length L.

Body 12 may comprise a consolidation of reinforcement fibers in the form of yarns 14 embedded in a suitable matrix material 16. Body 12 may be produced by known or other pultrusion or compression molding processes or other suitable manufacturing process(es). For example, a suitable pultrusion process may be used to form a continuous pultruded rod of desired diameter and structure from which a plurality of blanks 10 of desired length may be cut. Alternatively, body 12 may comprise a compression molded rod. Accordingly, yarns 14 comprising reinforcement fibers may be embedded inside body 12 and supported by matrix material 16. Matrix material 16 (e.g., the second phase of blank 10) may serve to hold the reinforcement fibers together in the desired shape, protect the reinforcement fibers and distribute loads through the reinforcement fibers. Ends of yarns 14 are shown at end 12A of blank 10 of FIG. 1A. During the pultrusion process, each yarn 14 brought together to consolidate blank 10 may comprise a plurality of reinforcement fibers as well as a plurality of filaments of matrix material 16 that are commingled. Alternatively or in addition, one or more of yarns 14 may comprise reinforcement fibers that are powder coated or otherwise impregnated with matrix material 16 prior to being consolidated. During pultrusion or other consolidation process(es), matrix material 16 may be at least partially melted and compressed together with yarns 14 so as to form a consolidated (e.g., thermoformed) rod of desired diameter and composition from which one or more blanks 10 may be cut.

In various embodiments, matrix material 16 may comprise a suitable thermoplastic or other thermo-formable material(s). For example, matrix material 16 may comprise one or more of the following: Nylon such as polyamide, polyetherimide (PEI), polyethersulfone (PES), polyphenylene sulfide (PPS), polyetheretherketone (PEEK) and polyetherketoneketone (PEKK). While the exemplary embodiments described and shown in the present disclosure are mainly directed to the use of thermo-formable materials such as thermoplastics, other types of materials may be suitable for use as matrix material 16. In some embodiments, matrix material 16 in blank 10 may, for example, include a thermosetting material such as a B-staged thermoset resin which may be softened by the application of heat and formed accordingly during installation of blank 10. In some embodiments, matrix material 16 may, for example, include an epoxy resin that is curable by exposure to ultraviolet (UV) light so that an exemplary blank 10 comprising a UV-curable resin may be positioned and shaped as desired for installation and subsequently cured with the application of UV light. The use of glass or other material(s) that is/are at least partially transparent to UV light as a material for reinforcement fibers used in yarns 14 may facilitate the curing of a UV-curable matrix material by permitting at least some UV light to penetrate the matrix material 16 more effectively via the reinforcement fibers.

Reinforcement fibers used in yarns 14 may, for example, comprise any suitable material typically used in the reinforcement of composite materials or other suitable material. In various embodiments, reinforcement fibers may comprise inorganic materials including glass or carbon filaments. For example, reinforcement fibers may comprise S-2 glass fibers and/or E-glass fibers. Yarns 14 may not necessarily comprise reinforcement fibers of all the same material. For example, each yarn 14 may comprise reinforcement fibers of different materials to achieve desired material and mechanical properties. In some embodiments, different yarns 14 may comprise reinforcement fibers of different materials. In some embodiments, the reinforcement fibers may be continuous or be discontinuous and optionally of different lengths.

The material of reinforcement fibers, size of reinforcement fibers, number of reinforcement fibers per yarn 14 and number of yarns 14 in blank 10 may be selected based on the specific application and desired properties for the fastener obtained from blank 10. For example, the specific structure of blank 10 may be selected based on factors such as size constraints, environmental and operating conditions, and the types and magnitudes of loads expected to be supported by the fastener. For example, in some embodiments, it may be appropriate to use yarns that each have about 12,000 carbon fibers of 6 μm (0.00024 inch) in diameter. For example, in order to produce a blank of about 4.75 mm (0.1875 inch) in diameter, 20 yarns of such carbon fibers may be used to form a pultruded rod from which blank 10 may be cut. Prior to pultrusion, such yarns 14 may also comprise thermoplastic filaments of about 20 μm (0.00079 inch) in diameter that are commingled with the reinforcement fibers so that the thermoplastic may form matrix material 16 after pultrusion.

The volume fraction of reinforcement fibers to matrix material 16 in blank 10 may also be selected based on the specific application. For example, in some embodiments, the volume fraction of reinforcement fibers in body 12 may be around 60%. In some embodiments, the volume fraction of reinforcement fibers in body 12 may be between about 55% and about 63%. In some embodiments, a suitable range for the volume fraction of reinforcement fibers in body 12 may be between about 30% and about 70%. In some embodiments, a suitable range for the volume fraction of reinforcement fibers in body 12 may be between about 50% and about 60%.

Yarns 14, and hence reinforcement fibers, may be supported by matrix material 16 and embedded inside of body 12. Each yarn 14 may comprise a grouping of reinforcement fibers generally following a common path and extending between first end 12A and second end 12B of body 12. In various embodiments, yarns 14 and hence the reinforcement fibers may extend continuously along the entire length L of body 12. Yarns 14 may be disposed at various radial distances from a core region (e.g., from axis A) of body 12 so that the reinforcement fibers may be disposed at various positions throughout the cross-section of body 12. For example, one or more yarns 14 may be disposed near or at a core region of body and/or near or at an outer region of body 12. In some embodiments, one or more of yarns 14 could follow respective paths extending between diametrically opposed surface portions of blank 10 while crossing axis A of blank 10. In some embodiments, one or more yarns 14 may also be disposed near or on an outer surface of body 12. For example, in addition to or instead of having yarns 14 embedded inside of body 12, one or more yarns 14 could also be disposed over (i.e., wrapped around) an outer surface of body 12.

FIG. 1B is a schematic representation of an exemplary braid structure 20 of yarns 14 that may be embedded inside blank 10. FIG. 1B may illustrate yarns 14 in region 1B shown in FIG. 1A. In various embodiments, at least some of yarns 14 may follow a path where at least part of the path has an orientation that is non-parallel to axis A of body 12. For example, yarns 14 may extend between first end 12A of body 12 and second end 12B of body 12 in a helical manner or along other directions that are divergent from axis A. In various embodiments, two or more yarns 14 may be braided together along at least a portion of length L of body 12. For example, a plurality of yarns 14 may be braided together at a desired inclination angle (e.g., braid angle) α that is measured from axis A. While blank 10 may comprise one or more yarns 14 or portions thereof that are non-parallel to axis A, blank 10 may also comprise one or more yarns 14 that are substantially parallel to axis A. For example, in some embodiments, blank 10 may comprise a combination of braided yarns 14 and unidirectional yarns 14.

The inclination angle α of yarns 14 may be selected based on the specific application and loads that the fastener is expected to withstand. For example, a relatively small inclination angle α (e.g., α shown in FIG. 1B) where yarns 14 are closer to being parallel to axis A may provide a higher tensile strength and stiffness from the fastener formed from blank 10. Alternatively, a relatively larger inclination angle (e.g., as shown in FIG. 2) may provide a higher hoop strength and stiffness from the fastener formed from blank 10. In some embodiments, blank 10 could comprise a combination of yarns 14 at small inclination angle(s) and yarns 14 at larger inclination angles depending on the properties desired. Accordingly, it may be possible to tailor the mechanical properties of a fastener produced from blank 10 to some extent by selecting one or more inclination angles for the reinforcement fibers. For some applications, an inclination angle of about 20 degrees may be suitable. In some embodiments, one or more inclination angles between about 15 degrees and about 30 degrees may be suitable. In some embodiments, one or more inclination angles between about 5 degrees and about 95 degrees may be suitable.

Figure 2A:
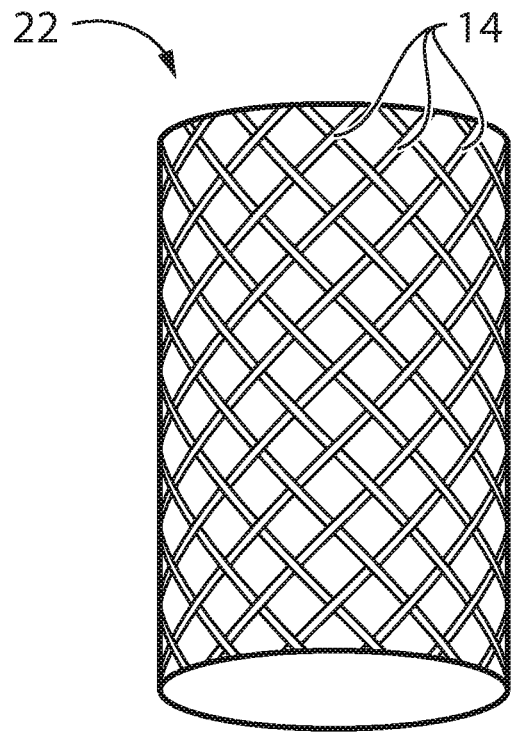
FIG. 2A is a schematic perspective view of an exemplary braid structure of yarns of reinforcement fibers that may be used to produce the blank of FIG. 1A.

FIG. 2A is a schematic perspective view of an exemplary braid structure 22 of yarns 14 of reinforcement fibers that may be used to produce blank 10. As shown, braid structure 22 may have a biaxial and tubular configuration but other known or other types of braid structures such as one or more tri-axial braids, 3-dimensional braids, unidirectional fibers and/or randomly oriented fibers could also be used in some applications. For example, other braid structures resembling a shoe lace or a rope may be used in some embodiments. Braid structure 22 may be used for the pultrusion of blank 10 as explained above.

Figure 2B:
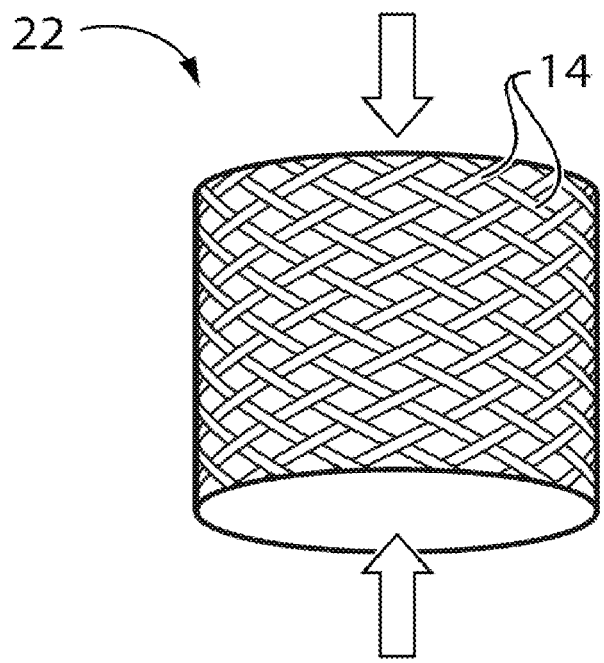
FIG. 2B is a schematic perspective view of the braid structure of FIG. 2A in a compressed state.

FIG. 2B is a schematic perspective view of braid structure 22 in a compressed state. Biaxial braids such as shown in FIG. 2A may be able to deform when they are tensed or compressed along their length as shown in FIG. 2B without causing significant damage to the reinforcement fibers. For example, like a Chinese finger trap, the diameter of braid structure 22 may decrease when braid structure 22 is tensed or elongated, or, the diameter of braid structure 22 may increase when braid structure 22 is compressed. When the diameter of braid structure 22 increases or decreases as braid structure 22 is tensed or compressed, yarns 14 may rotate at cross-over points without causing significant buckling of the reinforcement fibers. In some applications, this phenomenon may be advantageous because, as explained below, when blank 10 is installed by being compressed into a hole, the diameter of braid structure 22 may increase until it becomes in contact with the hole wall and may also conform to hole features such as a countersink or other irregularities in the hole. Accordingly, in some applications, the use of blank 10 may not require the high precision drilling techniques that can be required when using titanium rivets. Also, in some applications, the use of blank 10 may not require the use of sealant between the produced rivet and the part into which the rivet is formed.

Figure 3:
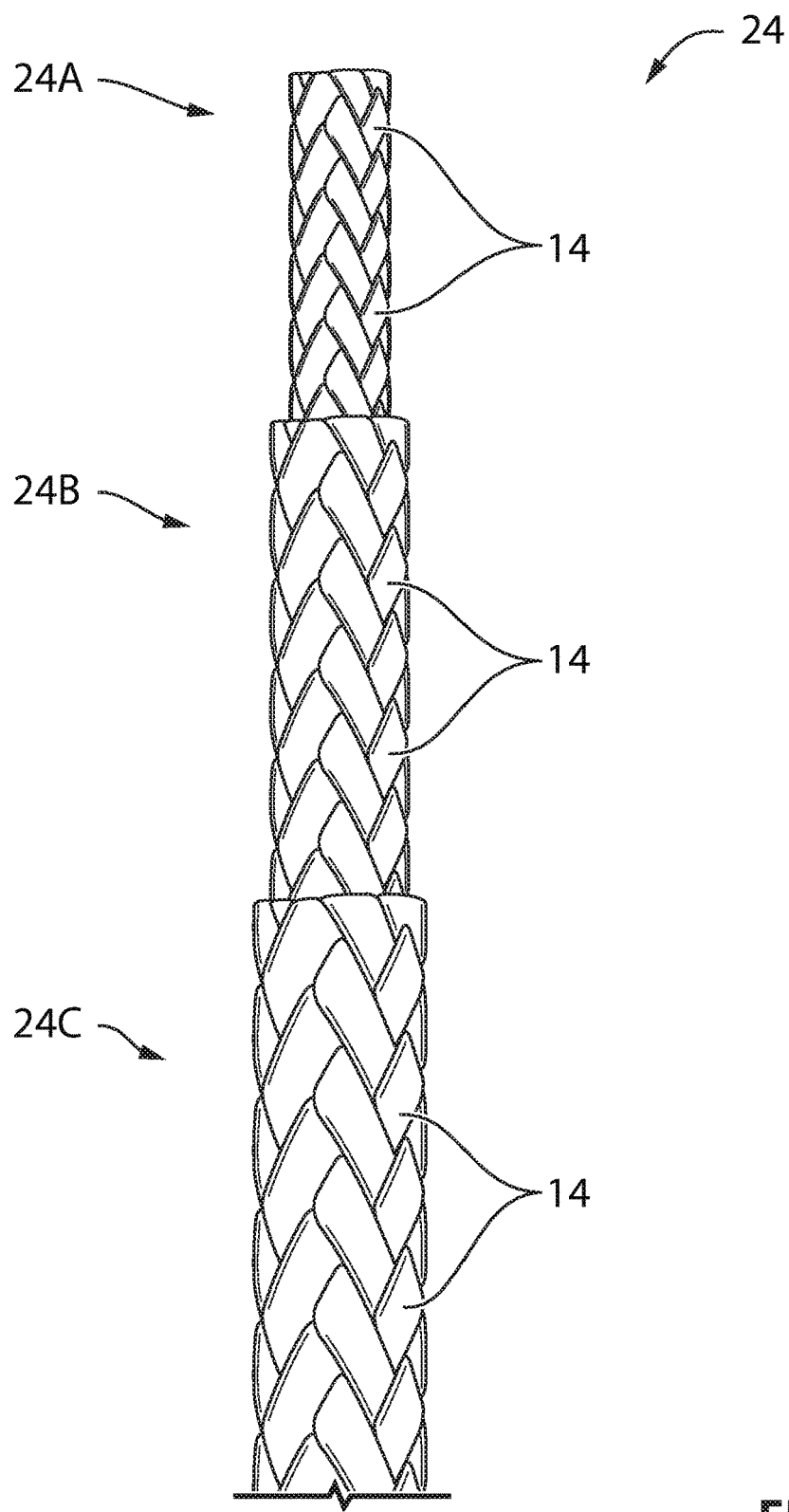
FIG. 3 is a schematic elevation view of another exemplary braid structure of yarns of reinforcement fibers that may be used to produce the blank of FIG. 1A.

FIG. 3 is a schematic view of another exemplary braid structure 24 of yarns 14 of reinforcement fibers that may be used to produce blank 10. Braid structure 24 may be used for the pultrusion of blank 10 as explained above. Braid structure 24 may comprise a plurality of nested tubular biaxial braids 24A, 24B and 24C. Other braid structures than those shown herein could be used for the pultrusion of blank 10. Combinations of different braid structures could also be used in the same blank 10. For example, nested (e.g., concentric) braids 24A, 24B and 24C could have the same or different structural parameters (e.g., size and type of reinforcement fibers, size and number of yarns, inclination angles, braiding structures, etc.)

FIGS. 4A-4D schematically illustrate a method for installing a composite rivet using blank 10. As mentioned above, blank 10 may be used to secure two or more parts together. For example, as shown in FIGS. 4A-4D, blank 10 may be used to secure two overlapping panels 26, 28 (e.g., lap joint). One or more of panels 26, 28 may comprise a composite material with which the materials of blank 10 may be compatible. Alternatively or in addition, one or more of panels 26, 28 may comprise a metallic material such as aluminum. For example, a blank 10 comprising glass reinforcing fibers may be suitable for fastening aluminum parts (e.g., aircraft skins) together. Panels 26, 28 may, for example, comprise aircraft structural parts such as fuselage or wing components of a fixed-wing aircraft or a helicopter. However, blank 10 could also be used to secure other types of parts. In some applications, blank 10 could also be used to at least partially fill a hole in a part while not necessarily securing two parts together. The composition of blank 10 may be selected so that it may be compatible with the materials of panels 26, 28. For example, blank 10 made of composite materials may be suitable for securing panels 26, 28 comprising the same or compatible materials so that the risk of galvanic corrosion may be reduced or avoided.

As illustrated in FIGS. 4A-4D, a method for installing a composite rivet using blank 10 may comprise: inserting blank 10 into a hole extending in one or more of panels 26, 28; and, after insertion of blank 10 into the hole: finishing first end 12A of blank 10 by thermoforming first end 12A of blank 10; and finishing second end 12B of blank 10 opposite first end 12A by thermoforming second end 12B of blank 10. The hole extending in one or more of panels 26, 28 may be a hole that extends completely through the one or more panels 26, 28. For example, when blank 10 is used to fill a hole in a single panel, the hole may extend through the single panel. Alternatively, when blank 10 is used to secure panel 26 and panel 28 together, the hole may comprise a first through hole disposed in panel 26 and a second through hole disposed in panel 28 where the first and second through holes are at least partially aligned together to permit passage of blank 10 therethrough.

FIGS. 4A-4D also show apparatus 34 for installing rivet 32 using blank 10. Apparatus 34 may comprise finishing members including first ram 36 for finishing first end 12A of blank 10 and second ram 38 for finishing second end 12B of blank 10. While apparatus 34 shows the use of two rams 36, 38, some embodiments of apparatus 34 could have only one movable ram 36 and ram 38 could be replaced with a stationary support member against which blank 10 could be pushed and also having a shape suitable for finishing second end 12B of blank 10. Rams 36, 38 may each be movably disposed in respective thermal insulators 40. Thermal insulators 40 may each have an annular shape and comprise a ceramic material or other suitable material with a relatively low thermal conductivity. In some embodiments, thermal insulators 40 may have the form of ceramic bushings. Opposing insulators 40 may be used to apply pressure on the lap joint between panel 26 and panel 28 during the installation of blank 10.

Figure 4A:
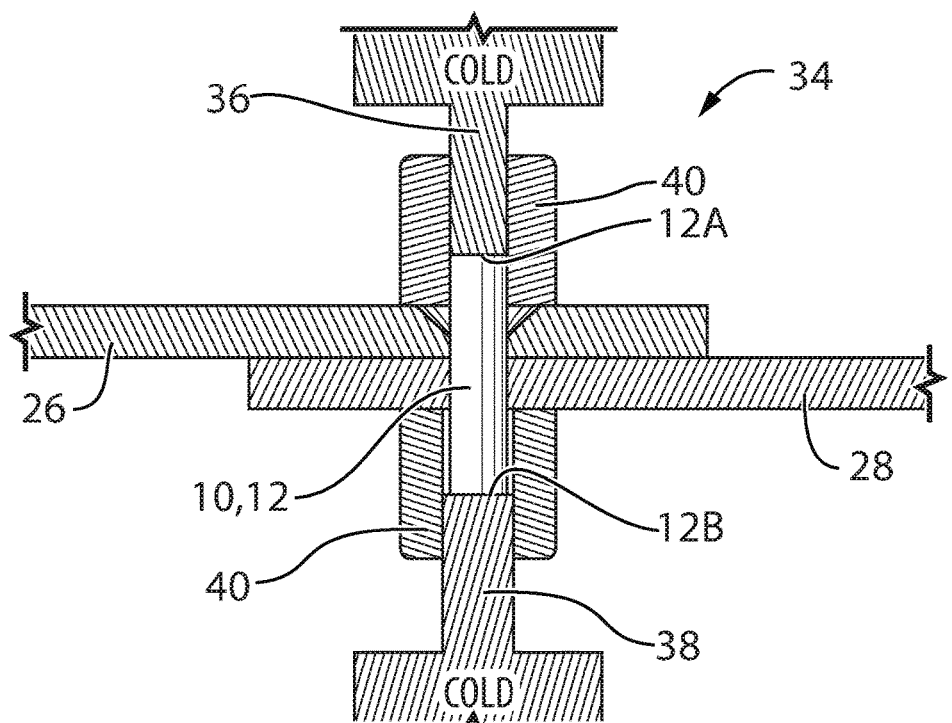
FIGS. 4A-4D schematically illustrate an exemplary method for installing the blank of FIG. 1 using an installation apparatus according to one embodiment.

In FIG. 4A, blank 10 has been inserted into holes formed in panel 26 and also in panel 28. As explained below, blank 10 could be heated prior to insertion into the holes or could be at ambient temperature when inserted into the holes. Once inserted, first end 12A and second end 12B of blank 10 may be finished by thermoforming. For example, both ends 12a and 12B of blank 10 may be finished substantially simultaneously or one at a time using first ram 36 and second ram 38 respectively. First and second rams 36, 38 may be used to apply both heat and pressure to first and second ends 12A, 12B respectively in order to carry out the thermoforming of blank 10. FIG. 4 shows both first and second rams 36, 38 as being initially at a relatively cold (e.g., ambient) temperatures.

Figure 4B:
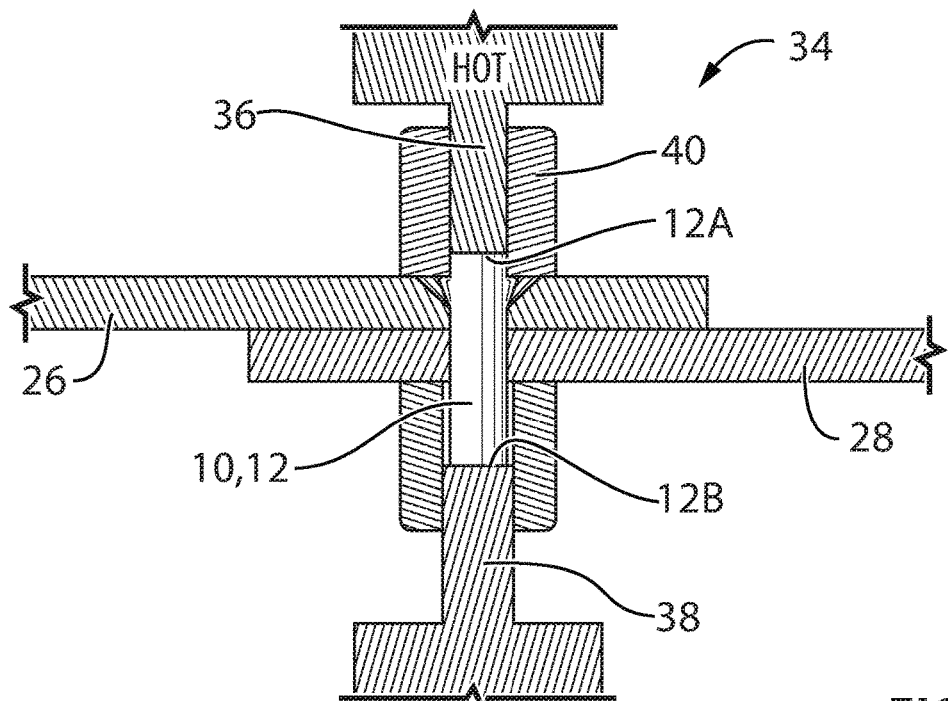

In FIG. 4B, pressure may be applied by first ram 36 and second ram 38 so as to compress blank 10. Heat may also be applied to first ram 36 and/or second ram 38. The combination of heat and a compressive force being applied to first end 12A of blank 10 via first ram 36 may cause softening and/or melting of matrix material 16 of blank 10 and may cause deformation (i.e., thermoforming) of first end 12A of blank 10. The deformation of first end 12A may cause first end 12A to conform to the shape of the hole and also to a first finishing cavity such as a countersink defined by first ram 36, panel 26 and associated insulator 40.

Figure 4C:
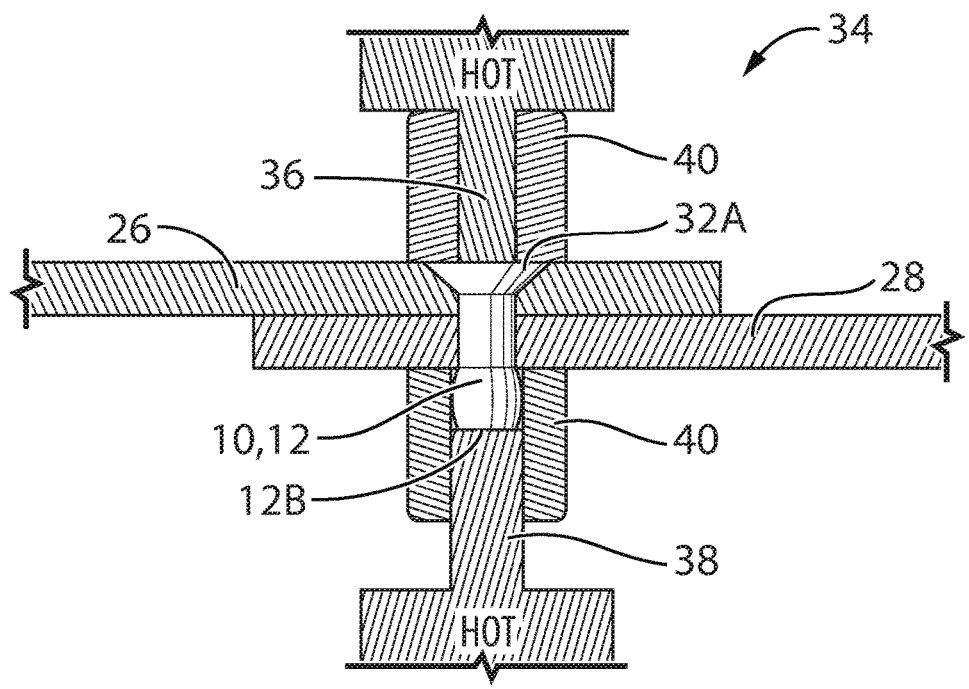

In FIG. 4C, heat may also be applied to second ram 38 in order to finish (e.g., buck) second end 12B of blank 10. The combination of heat and a compressive force being applied to second end 12B of blank 10 via second ram 38 may cause softening and/or melting of matrix material 16 of blank 10 and may cause deformation of second end 12B of blank 10. The deformation (i.e., thermoforming) of second end 12B may cause second end 12B to conform to the shape of the hole and also to a second finishing cavity defined by second ram 38, panel 28 and associated insulator 40.

Figure 4D:
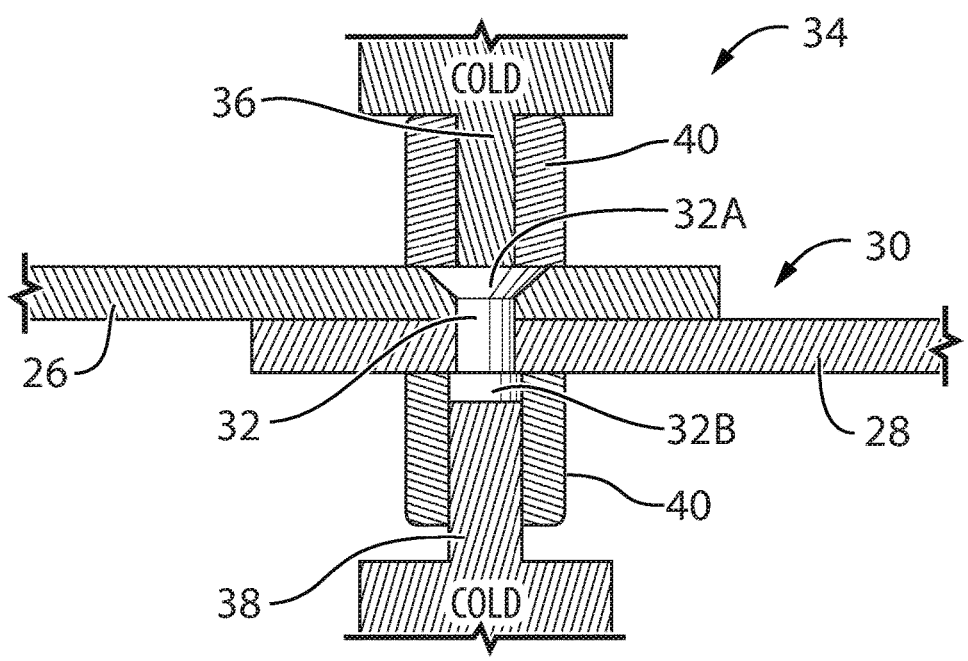

In FIG. 4D, first and second ends 12A, 12B of blank 10 have been finished (e.g., thermoformed) into first finished end 32A and second finished end 32B respectively. In other words, blank 10 has been transformed into composite rivet 32. First finished end 32A may be engaged with panel 26 and second finished end 32B may be engaged with panel 28 so as to secure panel 26 and panel 28 together. FIG. 4D also shows both first ram 36 and second ram 38 being cold (i.e., at a temperature lower than that required for thermoforming of blank 10). For example, one or both of first ram 36 and second ram 38 may be actively cooled in order to remove heat from composite rivet 32 and accelerate the solidification of composite rivet 32 after thermoforming. One or both of first ram 36 and second ram 38 may be cooled using a suitable cooling fluid such as air or other suitable fluid. Once composite rivet 32 has cooled to a desired temperature or solidification state, ram 36, insulators 40 and ram 38 may be removed from panels 26 and 28 and apparatus 34 may be moved to another location to re-start the process of installing another composite rivet 32 using another blank 10.

Figure 5A:
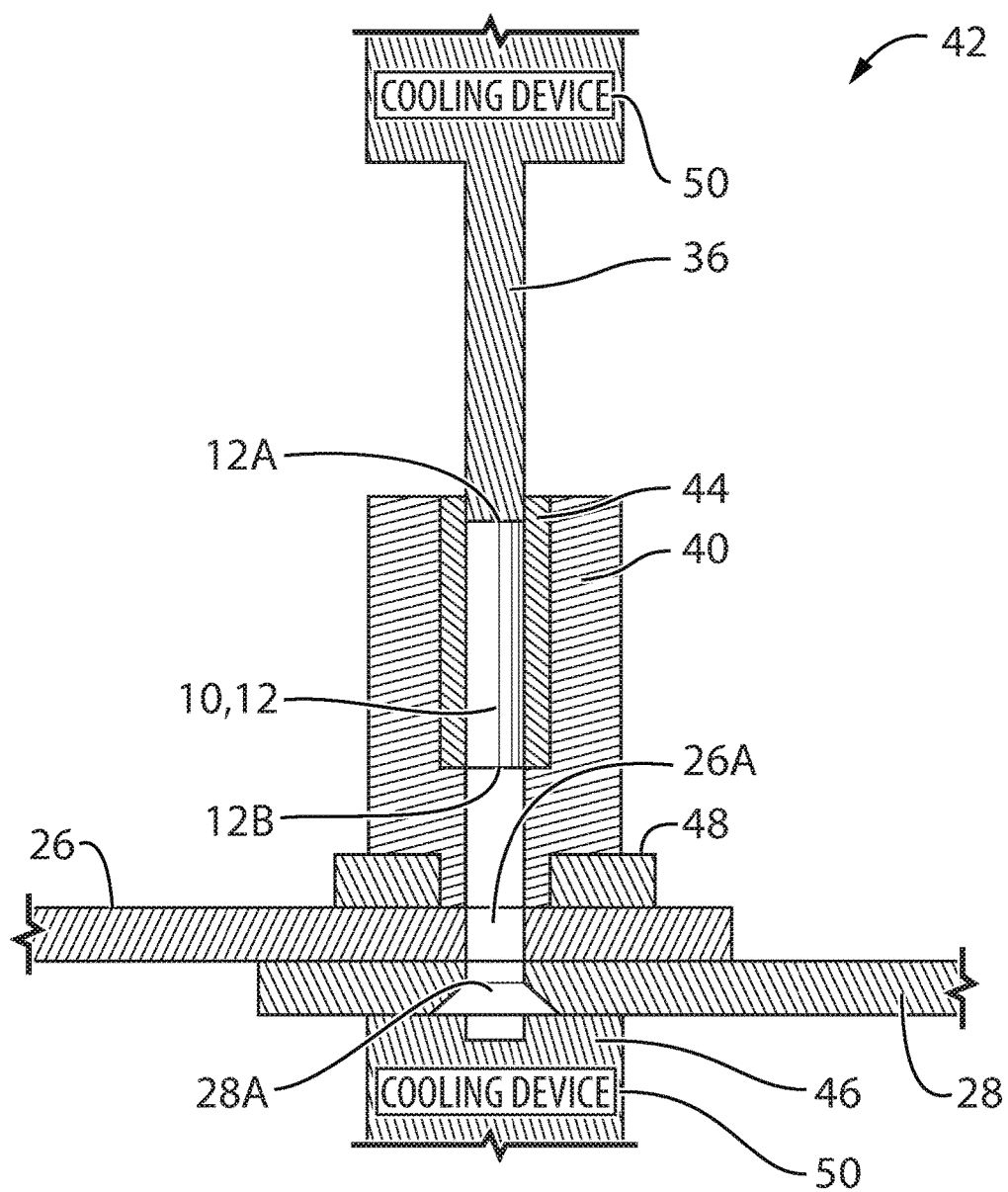
FIGS. 5A-5C schematically illustrate another exemplary method for installing the blank of FIG. 1 using another installation apparatus according to another embodiment.
Figure 5B:
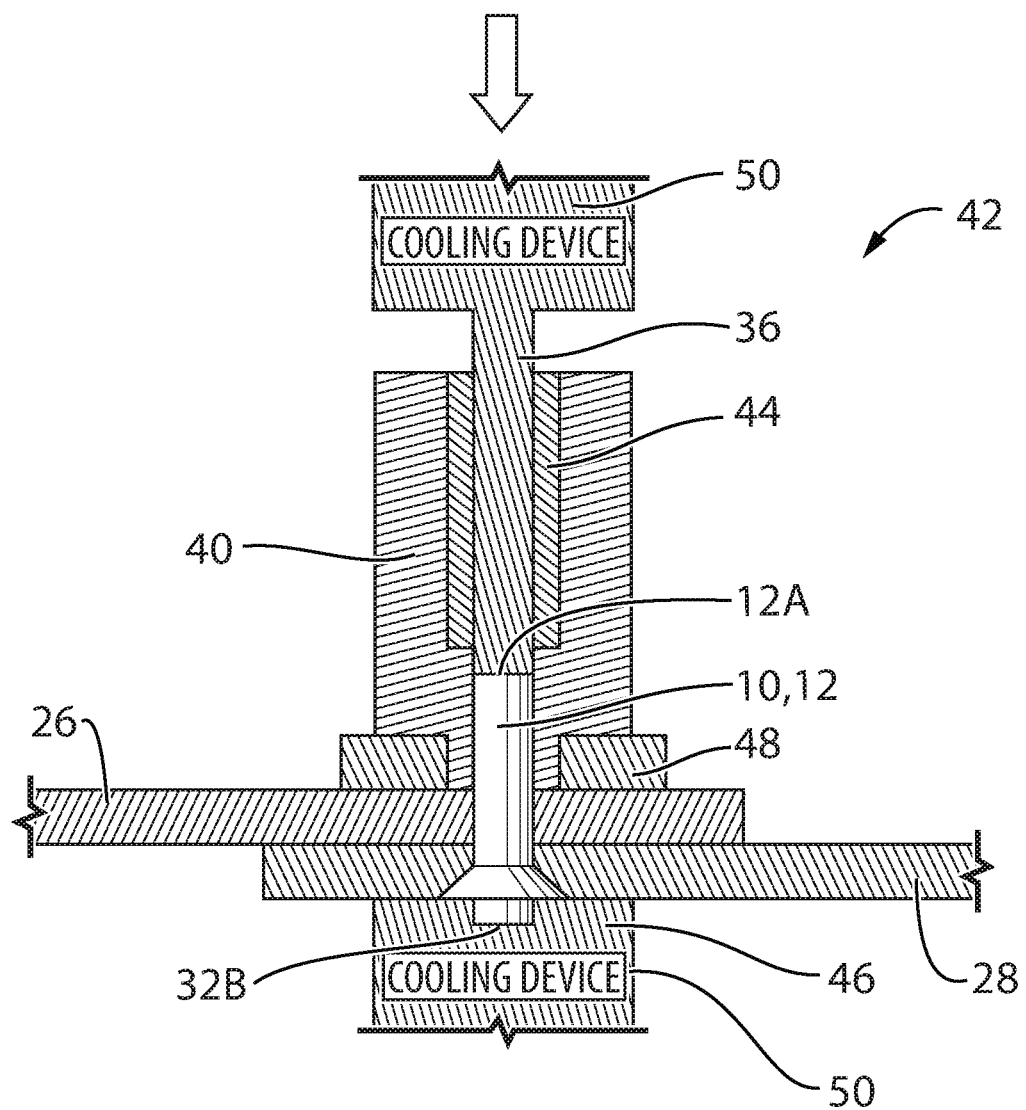
Figure 5C:
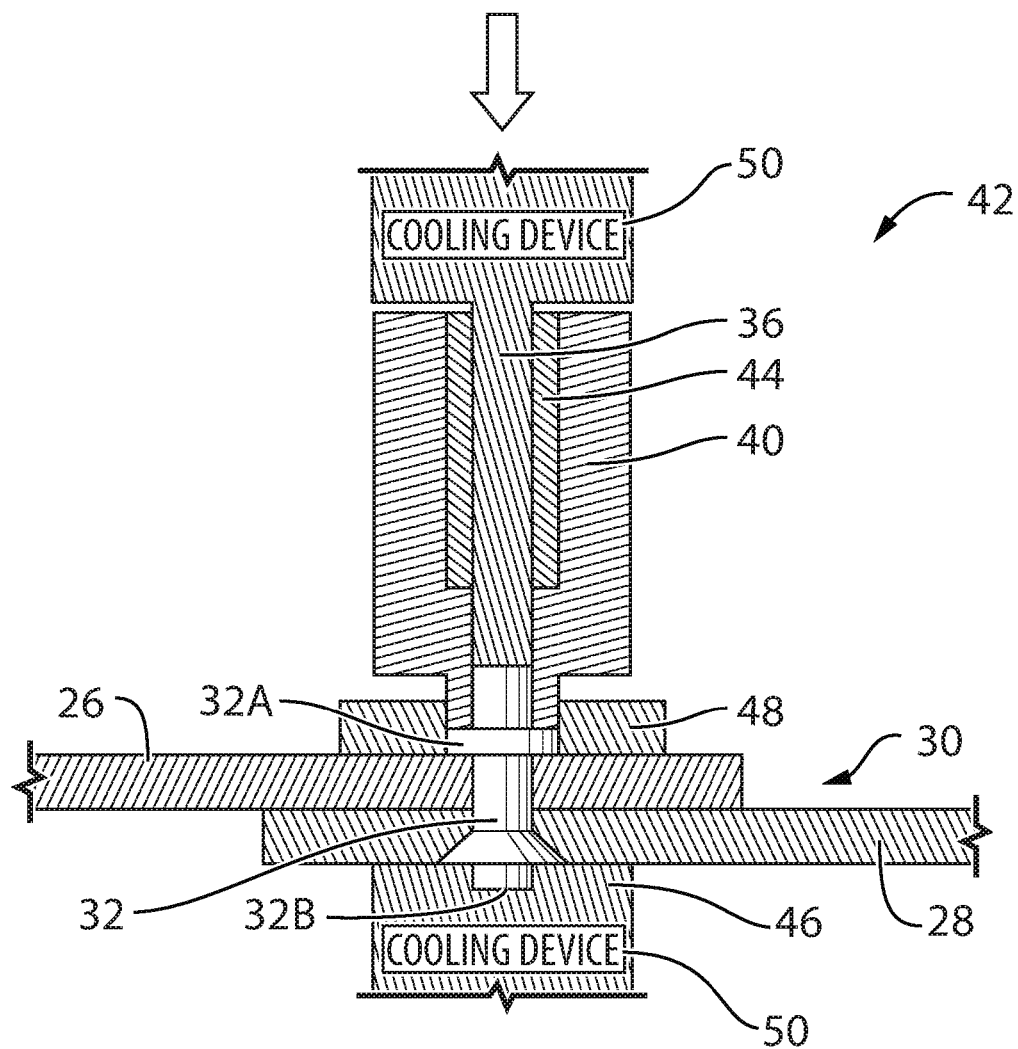

FIGS. 5A-5C schematically illustrate another exemplary method for installing blank 10 using another installation apparatus 42. Apparatus 34 of FIGS. 4A-4D and apparatus 42 of FIGS. 5A-5C may share some similarities so like elements have been identified using like reference numerals in the present disclosure. Using apparatus 42, blank 10 may be heated while outside of panels 26 and 28 prior to being inserted into first hole 26A and second hole 28A formed in panel 26 and panel 28 respectively. The heating of blank 10 while outside of panels 26 and 28 may limit an amount of heat transferred to panels 26 and 28. Accordingly, apparatus 42 may comprise heater 44 disposed inside of insulator 40. Heater 44 may comprise an electric heater having an annular configuration and suitable for heating blank 10 to a temperature permitting thermoforming of blank 10. For example, heater 44 may comprise an electric resistance heater or be part of an induction heating unit. Insulator 40 may prevent some of the heat from heater 44 from getting transferred into panel 26. Apparatus 42 may also comprise first ram 36 for pushing blank 10 into holes 26A, 28A after blank 10 has been heated to a temperature suitable for thermoforming. Instead of second ram 38 of apparatus 34, apparatus 42 may comprise stationary support member 46 which may have a function analogous to a bucking bar for finishing second end 12B of blank 10. Apparatus 42 may also comprise forming ring 48 that may be in direct contact with panel 26 and may assist in finishing (e.g., thermoforming) first end 12A of blank 10. One or more suitable cooling devices 50 may be thermally coupled to first ram 36 and support member 46. Alternatively, a common cooling device 50 may be thermally coupled to both first ram 36 and support member 46.

FIG. 5A shows ram 36 being retracted and blank 10 being heated by heater 44 prior to insertion into holes 26A, 28A through panel 26 and panel 28.

FIG. 5B shows ram 36 being advanced toward support member 46 and exerting a downward force on blank 10 to thereby cause deformation of blank 10, which has been heated to a temperature to permit thermoforming. Under the pressure exerted by ram 36, blank 10 may deform and fill the cavity defined by hole 28A and support member 46 in order to form second finished end 32B of composite rivet 32 (shown in FIGS. 5C and 6). As shown in FIG. 5B, hole 28A may comprise a countersink which may get filled by blank 10. Blank 10 may also deform outwardly to fill holes 26A and 28A.

FIG. 5C illustrates the forming of first finished end 32A of composite rivet 32. Once second finished end 32B has been formed, insulator 40 may be retracted (i.e., raised) by some distance so that ram 36, insulator 40, panel 26 and forming ring 48 may define a cavity which may be filled by blank 10 while ram 36 applies pressure on blank 10. Accordingly, pressure exerted by ram 36 may be maintained while insulator 40 is partially retracted so that the defined cavity may be filled in order to form first finished end 32A of composite rivet 32. For example, even though insulator 40 may be retracted, pressure on panels 26 and 28 may still be maintained via support member 46 and forming ring 48. Accordingly, in some embodiments, there may always be a pressure exerted on the lap joint between panels 26 and 28 throughout the process of installing rivet 32. Cooling device(s) 50 may draw heat from ram 36 and support member 46 in order to promote cooling and solidification of composite rivet 32. Once composite rivet 32 has cooled to a desired temperature or solidification state, ram 36, insulator 40, forming ring 48 and support member 46 may be removed from panels 26 and 28 and apparatus 42 may be moved to another location to re-start the process of installing another composite rivet 32 using another blank 10.

Figure 6:
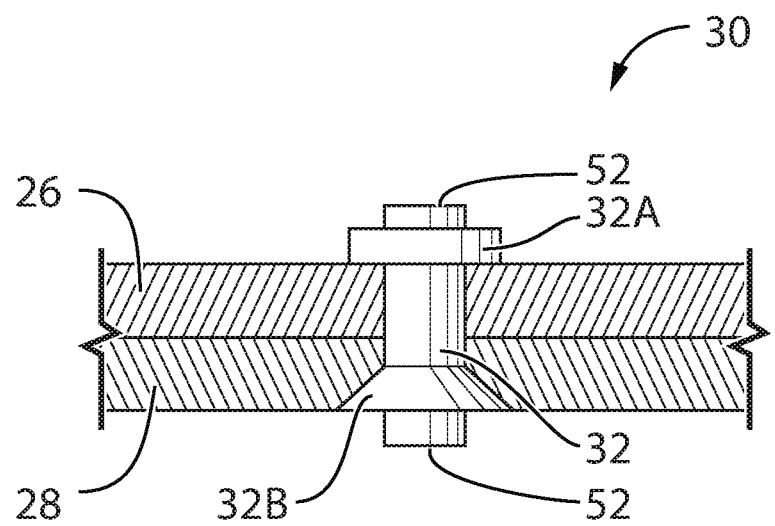
FIG. 6 is a cross-sectional view of a structural assembly comprising a rivet formed using the blank of FIG. 1.

FIG. 6 is a cross-sectional view of structural assembly 30. For example, structural assembly 30 may comprise, panel 26 having a first hole formed therein; panel 28 having a second hole formed therein; and composite rivet 32 (i.e., formed from blank 10) securing panel 26 and panel 28 together via the first hole and the second hole. Panel 26 and panel 28 may be positioned relative to each other so that the first hole is at least partially aligned with the second hole. Also composite rivet 32 may comprise a body having braided reinforcement fibers embedded in the body and supported in a matrix material 16 as described above. Composite rivet 32 may also comprise first finished end 32A engaged with panel 26 and second finished end 32B engaged with panel 28. In some embodiments, at least one of finished ends 32A, 32B may comprise fiber anchoring artifact 52 which, as explained below, may be used to at least partially control the deformation of the reinforcement fibers inside of composite rivet 32 during thermoforming of the at least one of the finished ends 32A, 32B. As shown in FIG. 6, fiber anchoring artifacts 52 may comprise a protrusion extending from each of first finished end 32A and second finished end 32B but other configurations of fiber anchoring artifacts 52 may also be suitable.

Figure 7:
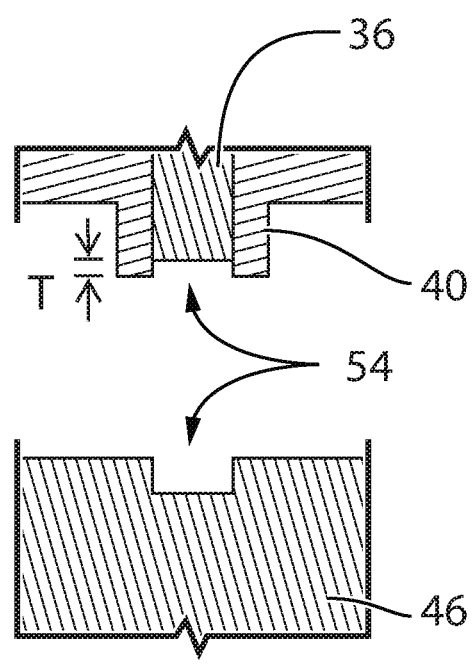
FIG. 7 is a cross-sectional view of finishing members of the installation apparatus of FIGS. 5A-5C.

FIG. 7 is a cross-sectional view of finishing members of installation apparatus 42 without showing structural assembly 30 therebetween. The relative positions of ram 36, insulator 40 and support member 46 correspond to those shown in FIG. 5C during the thermoforming of first finished end 32A. As shown in FIG. 7, the lower extremity of ram 36 is at distance T above the lower extremity of insulator 40 when blank 10 is thermoformed and first finished end 32A of composite rivet 32 is formed. The recess defined by the distance T between ram 36 and the lower end of insulator 40 serves as a fiber anchoring feature 54 in order to at least partially control the deformation of reinforcement fibers embedded inside of blank 10 during the thermoforming of blank 10. A similar fiber anchoring feature 54 (e.g., recess) may also be defined in support member 46. The presence of fiber anchoring features 54 may result in corresponding fiber anchoring artifacts 52 being formed on first finished end 32A and on second finished end 32B of composite rivet 32.

During the compression of blank 10 and the thermoforming of first finished end 32A and second finished end 32B, fiber anchoring features 54 may receive and at least partially anchor the ends of yarns 14 and prevent the ends of yarns 14 from being deflected in random and unpredictable directions, which could otherwise occur if finishing members (e.g., ram 36, insulating member 40 and support member 46) did not provide any form of anchoring or guidance of the reinforcement fibers during thermoforming. In some embodiments, the use of fiber anchoring features 54 may provide some control over the deformation of the reinforcement fibers especially in first and second finished ends 32A, 32B and thereby improves the repeatability and predictability of the thermoforming and also of the mechanical properties of composite rivet 32.

Figure 8:
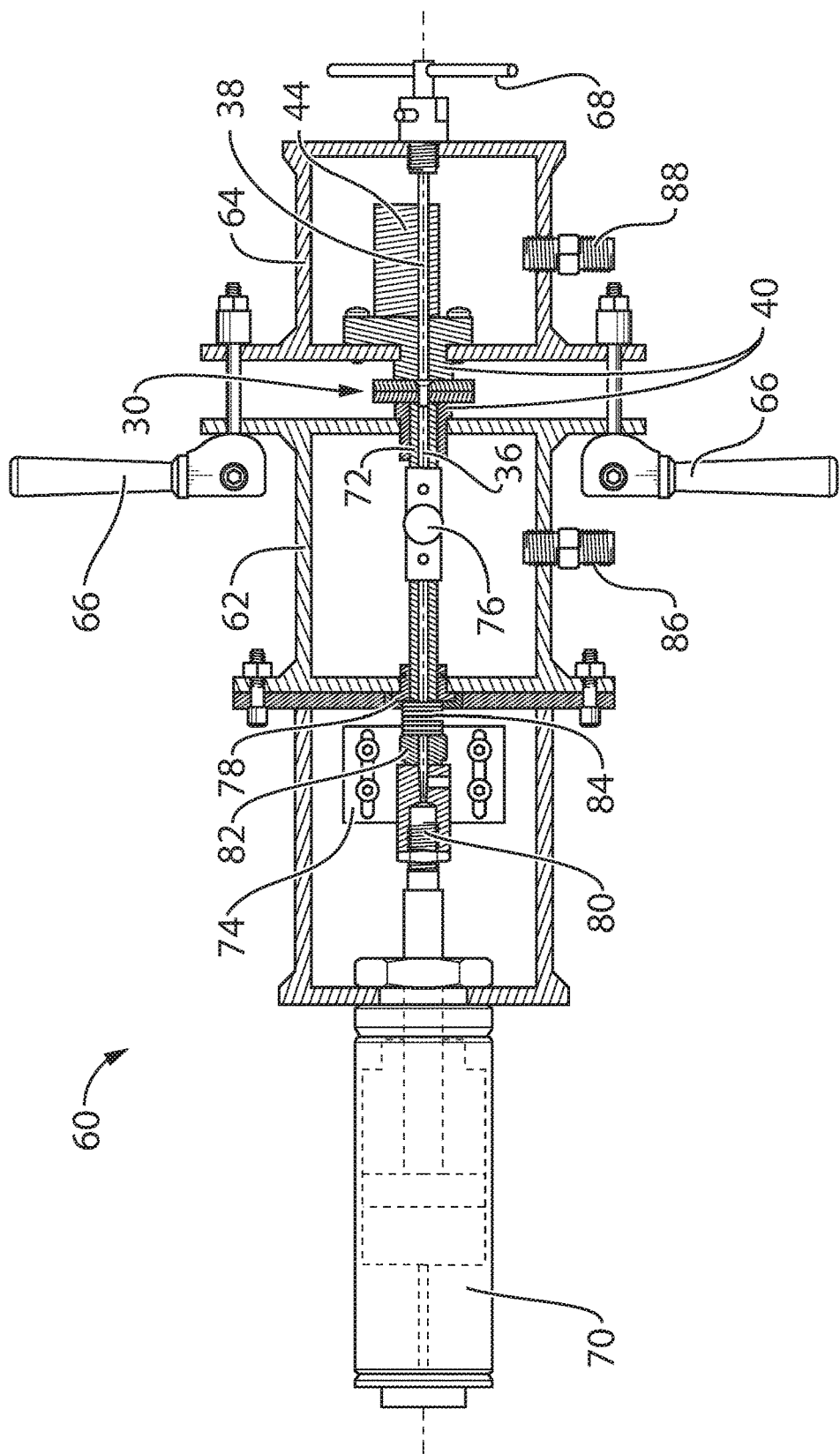
FIG. 8 is a top plan view of another exemplary installation apparatus according to another embodiment.

FIG. 8 is a top plan view of another exemplary installation apparatus 60 according to another embodiment. Apparatus 60 and apparatus 34 and 42 described above may share some similarities so like elements have been identified using like reference numerals in the present disclosure. Apparatus 34, 42 and 60 or parts thereof may be supported by one or more operators during operation or could be supported by suitable structure (e.g., jig). Apparatus 60 may comprise first frame 62 that may be configured to be positioned on a first side of structural assembly 30, and, second frame 64 that may be configured to be positioned on a second (e.g., opposite) side of structural assembly 30. First frame 62 and second frame 64 may be urged toward one another via one or more clamps 66 or other suitable structure or operator(s) of apparatus 60. The urging of first frame 62 and second frame 64 towards each other may cause a compressive force to be exerted on structural assembly 30 via insulators 40 disposed on opposite sides of structural assembly 30.

Second ram 38 may be associated with and supported by second frame 64 and may be configured to be actuated via wheel 68. The turning of wheel 68 may cause advancement and retraction of second ram 38 via suitable threaded engagement (not shown). The use of wheel 68 to actuate second ram 38 may provide suitable position control of second ram 38. Other means of actuation of second ram 38 may be used to control the position of second ram 38. Heater 44 may also be associated with second frame 64 so that blank 10 may be heated by heater 44 prior to insertion into holes formed in panels 26, 28 of structural assembly 30.

First ram 36 may be associated with and supported by first frame 62 and may be configured to be actuated via actuator 70. For example, first ram 36 may be coupled to actuator 70 via one or more set screws. Actuator 70 may comprise one or more pneumatic cylinders or other hydraulic actuator(s) configured to maintain a desired force applied by first ram 36 and thereby maintain a desired pressure on blank 10 during installation of blank 10. Other means of actuation could be used to control the force applied by first ram 36. Accordingly, in some embodiments, second ram 38 may be position-controlled and first ram 36 may be force-controlled.

Figure 9A:
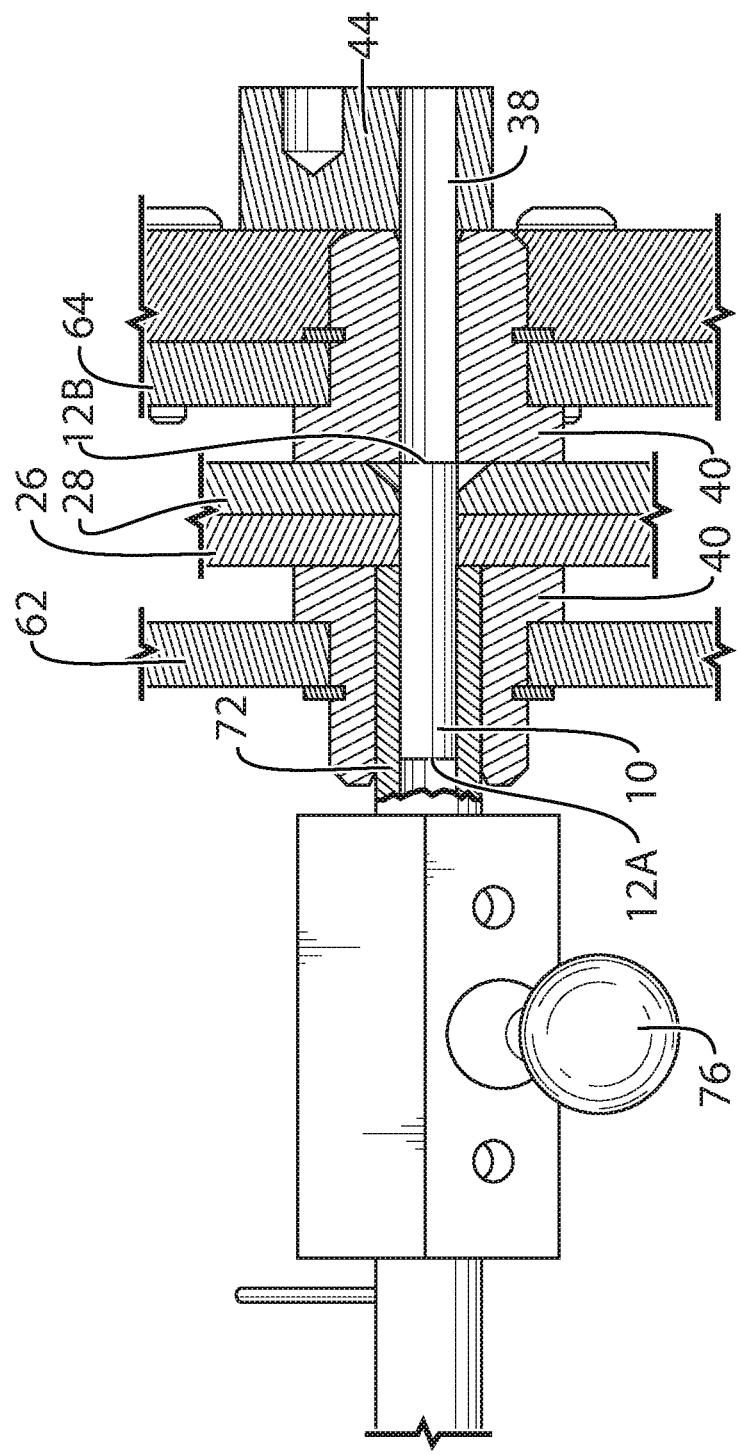
Figure 9B:
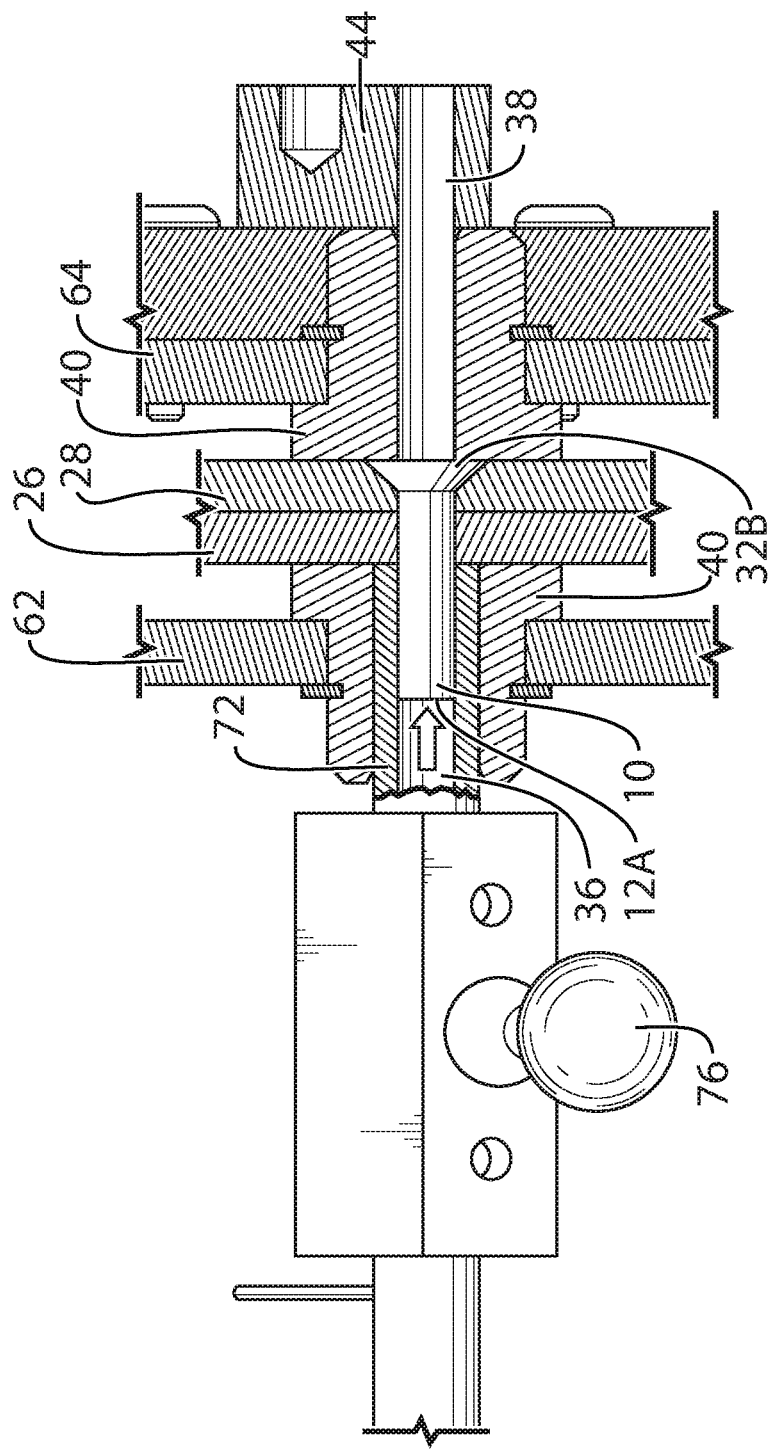
Figure 9C:
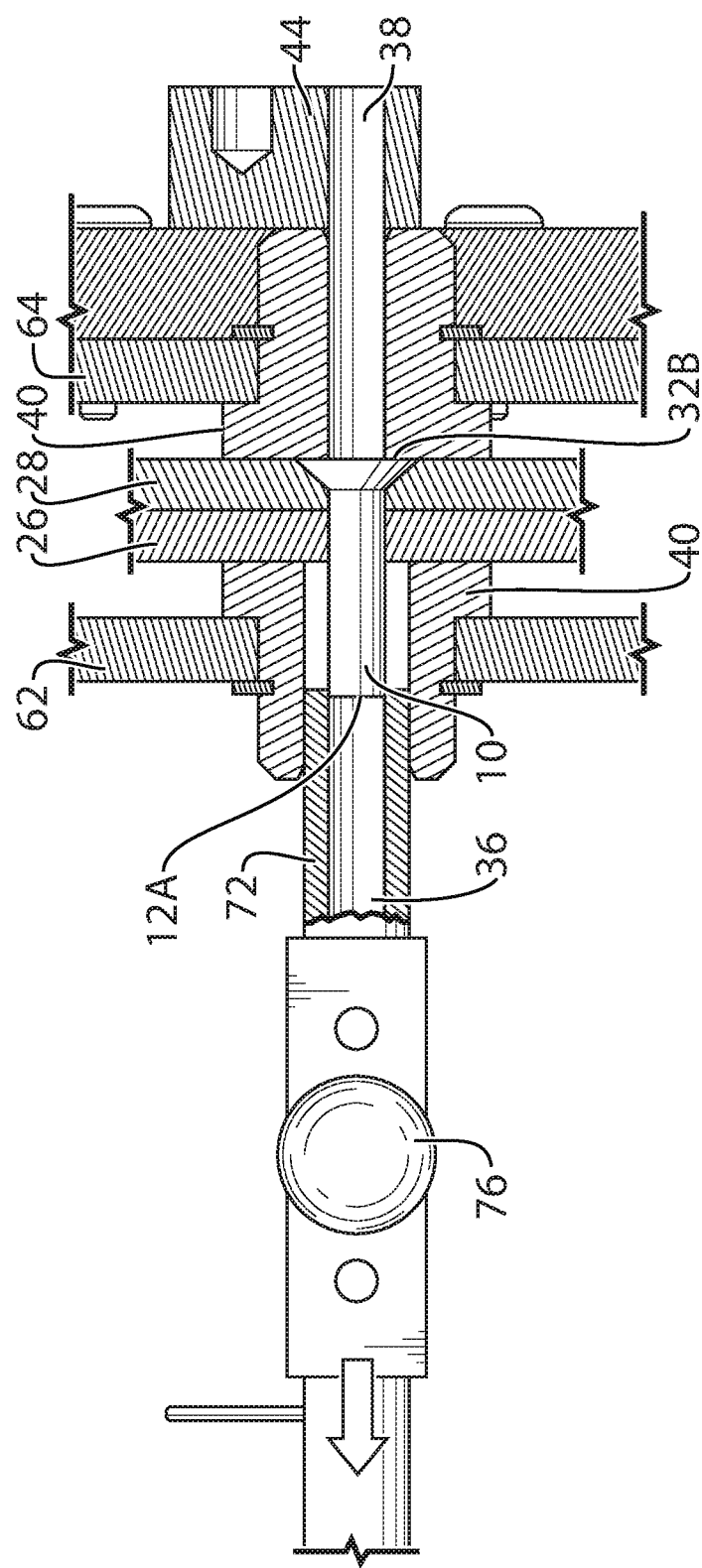

First ram 36 may be disposed inside of sleeve 72. Sleeve 72 may be movable relative to first ram 36 and also movable relative to insulator 40. Sleeve 72 may extend into associated insulator 40 and also be coupled to or uncoupled from locking plate 74. Sleeve 72 may be rotatable about its longitudinal axis using handle 76 in order to either lock sleeve 72 with locking plate 74 or unlock sleeve 72 from locking plate 74. For example, locking plate 74 may be rigidly fastened to frame 62 via suitable fasteners or be integral to first frame 62. Locking plate 74 may also comprise a locking feature which may be used to lock sleeve 72 in its first (i.e., locked) position as shown in FIGS. 9A and 9B. For example, the locking feature on locking plate 74 may cooperate with a corresponding locking feature on sleeve 72 in order to prevent retraction of sleeve 72 when sleeve 72 is at a first orientation (e.g., when handle 76 is lowered as shown in FIGS. 9A and 9B) and permit retraction of sleeve 72 when sleeve 72 is at a second orientation (e.g., when handle 76 is raised as shown in FIGS. 9C and 9D). Any other suitable structure secured to or integral with frame 62 could be used to lock and unlock sleeve 72.

Accordingly sleeve 72 may be movable relative to first ram 36 via handle 76. Also, during initial advancement of first ram 36 toward structural assembly 30 via actuator 70, first ram 36 may be advanced relative to sleeve 72 until pusher 80 makes contact with catch 82. Pusher 80 may be secured to actuator 70 and be advanced together with first ram 36. Catch 82 may be secured to or integral with sleeve 72. For example, catch 82 may comprise a portion of sleeve 72 having an increased outer diameter. Accordingly, once pusher 80 makes contact with catch 82 advancement force from actuator 70 may be transmitted to both first ram 36 and sleeve 72 so that first ram 36 and sleeve 72 may be urged toward structural assembly 30 and cooperate in the thermoforming of blank 10.

Spring 84 may be disposed between catch 82 and bushing 78. Accordingly, when actuator 70 urges sleeve 72 toward structural assembly 30 via pusher 80 and catch 82, actuator 70 may also cause compression of spring 84. However, when sleeve 72 is rotated to its second (i.e., unlocked) position by the raising of handle 76, spring 84 may assist the retraction of sleeve 72 by urging (catch 82 of) sleeve 72 away from structural assembly 30 in the absence of a counteracting force being exerted on catch 82 by actuator 70 via pusher 80.

First fitting 86 may be secured to first frame 62 to permit the introduction of a cooling fluid such as air inside first frame 62 to actively cool first ram 36 and sleeve 72. Similarly, second fitting 88 may be secured to second frame 64 to permit the introduction of a cooling fluid such as air inside second frame 64 to actively cool second ram 38 and heater 44.

FIGS. 9A-9D schematically illustrate another exemplary method for installing blank 10 using installation apparatus 60. Steps of installing blank 10 are sequentially shown in FIGS. 9A-9D. FIGS. 9A-9D only show portions of apparatus 60 near panels 26 and 28 to illustrate the installation of blank 10. Using apparatus 60, blank 10 may be heated while outside of panels 26 and 28 prior to being inserted in panels 26 and 28. Accordingly, blank 10 may be heated by heater 44 while second ram 38 is retracted. Once blank 10 has been heated to a temperature suitable for thermoforming, second ram 38 may be advanced so as to push blank 10 through the holes formed in panels 26 and 28 as shown in FIG. 9A while relatively little to no pressure is applied by first ram 36 and first ram 36 is therefore permitted to retract to accommodate the insertion of blank 10. In some embodiments, first ram 36 may already be retracted when blank 10 is initially inserted through panels 26 and 28.

FIG. 9A shows second ram 38 in a fully extended position. As explained above in relation to apparatus 42, second ram 38 may be positioned at a distance short of the surface of insulator 40 which is in contact with panel 28 so as to define a recess that may serve as a fiber anchoring feature (similar to feature 54 shown in FIG. 7). At this stage, sleeve 72 may be in its first (i.e., locked) position and fully extended against panel 26 as indicated by the lowered position of handle 76.

FIG. 9B shows the finishing of second finished end 32B of composite rivet 32. While blank 10 is still at a temperature suitable for thermoforming, second ram 38 is in its extended position and sleeve 72 is in its fully extended position against panel 26, first ram 36 may be extended by the application of a suitable force by actuator 70. The extension of first ram 36 may cause the blank 10 to fill the cavity (e.g., countersink) defined by panel 28, second ram 38 and associated insulator 40 and thereby produce second finished end 32B of composite rivet 32.

FIG. 9C shows the unlocking and retraction of sleeve 72 away from panel 26 after second finished end 32B has been thermoformed and in preparation for the finishing of first finished end 32A shown in FIG. 9D. The retraction of sleeve 72 may be achieved by rotating sleeve 72 to its second (i.e., unlocked) position by raising handle 76 and then manually retracting sleeve 72 away from panel 26 via handle 76. The rotation and retraction of sleeve 72 could be conducted manually by an operator or a suitable actuator could be provided as part of apparatus 60 to conduct the rotation and retraction of sleeve 72.

FIG. 9D shows the forming of composite rivet 32 by producing (e.g., bucking) first finished end 32A. As explained above, during the final portion of the stroke of first ram 36, both sleeve 72 and first ram 36 are advanced together by actuator 70. As shown in FIG. 9D, the leading end of first ram 36 may be behind the leading end of sleeve 72 so that a fiber anchoring feature (e.g., such recess 54 shown in FIG. 7) may be produced. The pressure applied to blank 10 by first ram 36 and sleeve 72 may cause blank 10 to fill the cavity defined by first ram 36, sleeve 72, panel 26 and associated insulator 40 in order to produce first finished end 32A of composite rivet 32. Once first finished end 32A has been produced, portions of apparatus 60 may be actively cooled to accelerate the cooling and solidification of composite rivet 32. For example, a source of air or other cooling fluid may be used to actively cool first ram 36, sleeve 72, second ram 38 and heater 44. Once composite rivet 32 has cooled to a desired temperature or solidification state, apparatus 60 may be moved to another location to re-start the process of installing another composite rivet 32 using another blank 10 on the same panels 26 and 28 or on different parts.

Figure 10:
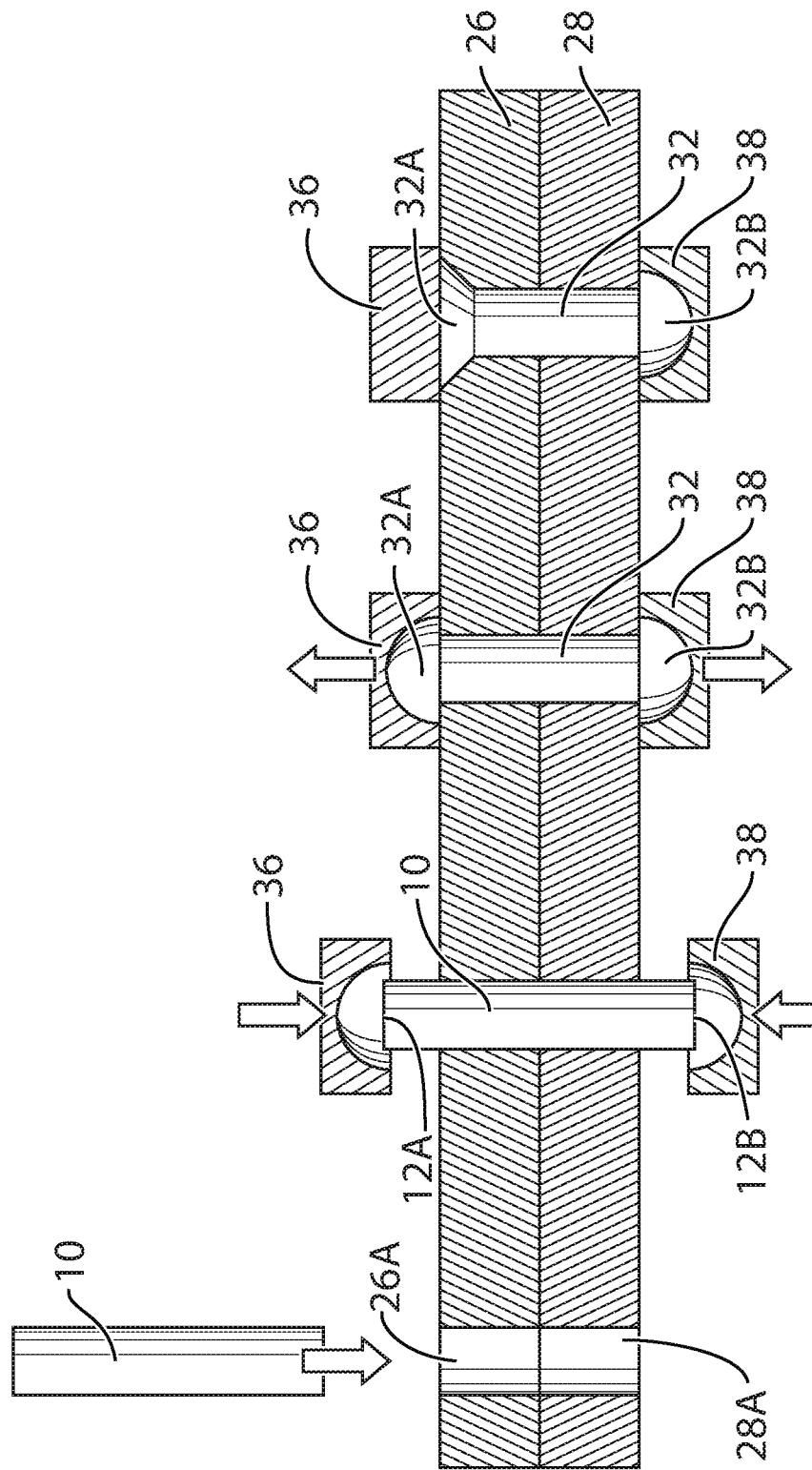
FIG. 10 schematically illustrates another exemplary method for installing the blank of FIG. 1 using different types of finishing members.

FIG. 10 schematically illustrates another exemplary method for installing blank 10 using different types of end finishing members. FIG. 10 illustrates different stages of installation from left to right of FIG. 10. Starting on the left of FIG. 10, blank 10 may be inserted through first hole 26A formed in panel 26 and second hole 28A formed in panel 28A. Then, first and second rams 36, 38 (i.e., end finishing members) may be used to compress blank 10 into holes 26A and 28A and produce finished ends 32A and 32B of composite rivet 32. One or both of first and second rams 36, 38 may be heated in order to cause thermoforming of blank 10. Alternatively or in addition, blank 10 may be heated to a suitable thermoforming temperature prior to being inserted into holes 26A and 28A. One or both of first and second rams 36, 38 may have a hemispherical shape so as to produce corresponding hemispherical finished ends 32A and 32B on composite rivet 32. On the right side of FIG. 10, another embodiment of first ram 36 is shown as having a flat face for compressing blank 10 into a countersink formed in panel 26.

In any case, first finished end 32A may be engaged with panel 26 and second finished end 32B may be engaged with panel 28.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, while the blanks, fasteners, assemblies, apparatus and methods disclosed and shown herein may comprise a specific number of elements or steps, the blanks, fasteners, assemblies, apparatus and methods could be modified to include additional or fewer of such elements or steps. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A composite fastener blank comprising:
an elongated body having an axis and a length along the axis, the body comprising braided reinforcement fibers embedded inside the body and supported in a matrix material, the braided reinforcement fibers comprising a first braid and a second braid nested in the first braid, the braided reinforcement fibers forming a braid structure where a diameter of the braid structure increases upon compression of the braid structure such that the blank is installable in a hole by compression of the blank, wherein said blank is formed from at least one of a pultruded rod or a compression molded rod from which said blank is cut.

2. The blank as defined in claim 1, wherein the braided reinforcement fibers extend the length of the body.

3. The blank as defined in claim 1, wherein the fibers of the first braid comprise carbon.

4. The blank as defined in claim 1, wherein at least some of the fibers are oriented at an inclination angle between 15 degrees and 30 degrees from the axis of the body.

5. The blank as defined in claim 1, wherein at least some of the fibers are oriented at an inclination angle of about 20 degrees from the axis of the body.

6. The blank as defined in claim 1, wherein the volume fraction of reinforcement fibers in the body is between 55% and 63%.

7. The blank as defined in claim 1, wherein the volume fraction of reinforcement fibers in the body is about 60%.

8. The blank as defined in claim 1, wherein the first and second braids are tubular biaxial braids.

9. A composite rivet comprising:
a body having braided reinforcement fibers embedded inside the body and supported in a matrix material, the braided reinforcement fibers comprising a first braid and a second braid nested in the first braid, the body comprising a first finished end for engaging a first part and a second finished end for engaging a second part, wherein said body is formed from at least one of a pultruded rod or a compression molded rod from which said body is cut.

10. The rivet as defined in claim 9, wherein at least one of the finished ends comprises a fiber anchoring protrusion used to at least partially control the deformation of the fibers during finishing of the at least one of the finished ends.

11. The rivet as defined in claim 9, wherein the fibers of the first braid comprise carbon.

12. The rivet as defined in claim 9, wherein the first and second braids are tubular biaxial braids.

* * * * *